(No Model.) 3 Sheets—Sheet 1.

C. H. WEEKS & W. SELLERS.
OSCILLATING SULKY HARROW.

No. 393,801. Patented Dec. 4, 1888.

Fig. 1.

WITNESSES:
Phil C. Dietrich.
C. Sedgwick.

INVENTOR:
C. H. Weeks.
W. Sellers.
BY Munn & Co.
ATTORNEYS.

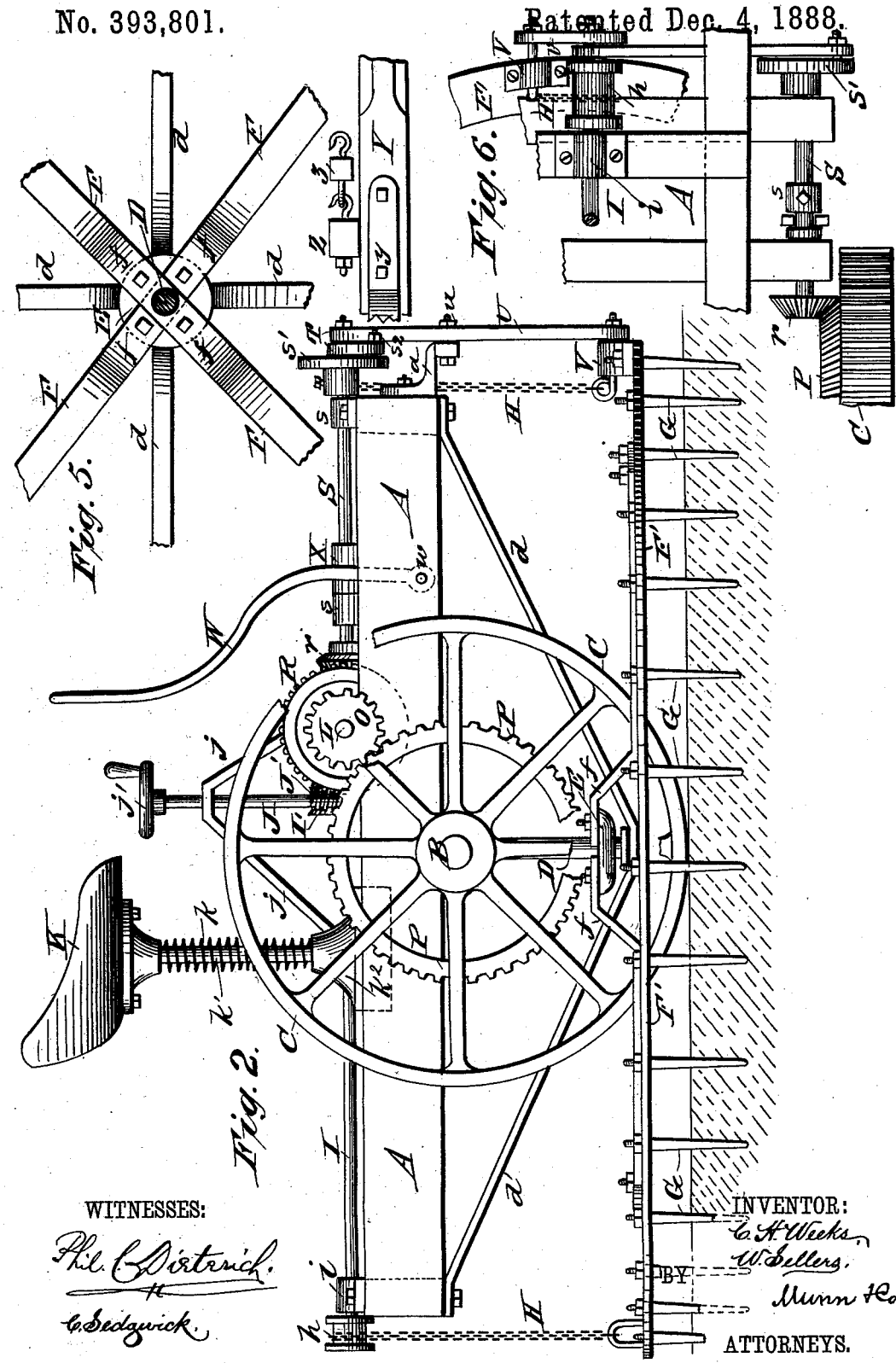

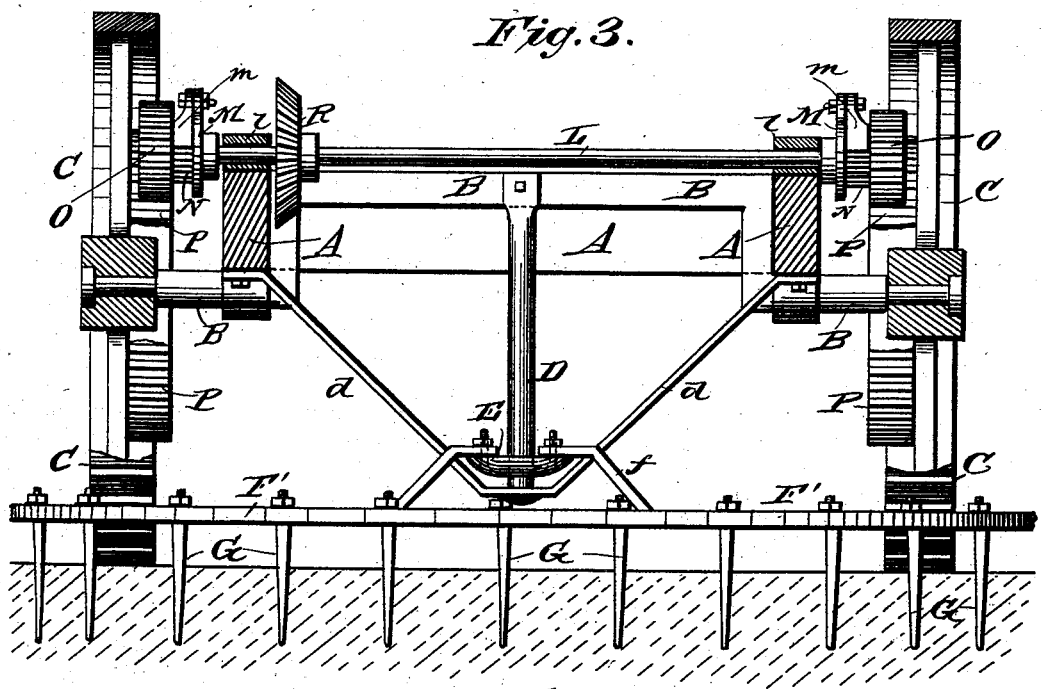
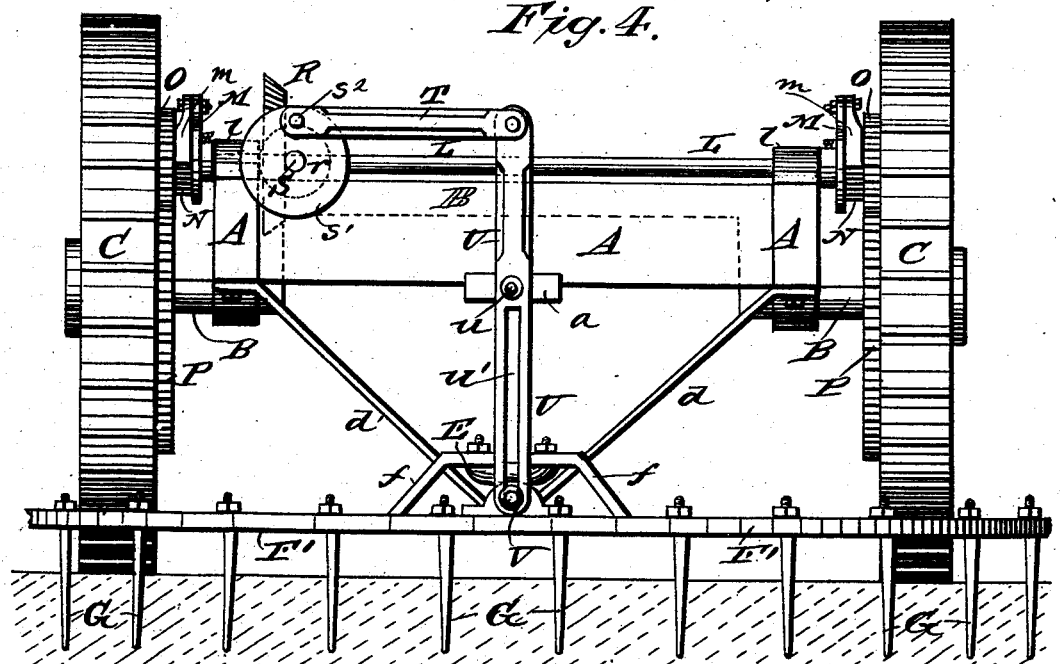

UNITED STATES PATENT OFFICE.

CALVIN HUGH WEEKS AND WILLIAM SELLERS, OF HAVERHILL, MASSACHUSETTS.

OSCILLATING SULKY-HARROW.

SPECIFICATION forming part of Letters Patent No. 393,801, dated December 4, 1888.

Application filed January 23, 1888. Serial No. 261,593. (No model.)

*To all whom it may concern:*

Be it known that we, CALVIN HUGH WEEKS and WILLIAM SELLERS, of Haverhill, in the county of Essex and State of Massachusetts, have invented a new and Improved Oscillating Sulky-Harrow, of which the following is a full, clear, and exact description.

Our invention relates to a harrow, and has for its object to provide an agricultural implement of this class which will easily and effectively harrow plowed land by one passage over it, and with economy of time and labor.

The invention consists in certain novel features of construction of the harrow, all as hereinafter described and claimed.

Reference is to be had to the accompanying drawings, forming a part of this specification, in which similar letters of reference indicate corresponding parts in all the figures.

Figure 1 is a plan view of our improved harrow, partly broken away. Fig. 2 is a side elevation of the harrow, partly broken away. Fig. 3 is a transverse section taken about in the plane of the sulky-axle. Fig. 4 is a detail front view of the machine with parts removed. Fig. 5 is a detail plan view of the central portion of the harrow-frame with the harrow-shaft in cross-section, and Fig. 6 is a detail plan view of a modified arrangement of gearing for oscillating the harrow from one of the sulky-wheels.

The sulky-frame A is supported on an axle, B, which is preferably arched at its center, as shown in Figs. 3 and 4 of the drawings, and is carried in the hubs of the sulky-wheels C C, which are preferably made of cast metal with ribbed or toothed peripheries or tires, preventing slip of them on the ground. To the center of the axle B is fixed the upper end of a vertical shaft, D, the lower end of which is braced effectively by diagonally-ranging stay-bars $d$, bolted to the frame.

On the shaft D is placed loosely a hub or plate, E, to which are bolted the upturned inner ends, $f$, of four bars, F, to the outer ends of which is fixed a rim, F', preferably circular in form. The bars F and rim F' constitute the harrow-frame, in which are fixed, at suitable distances apart, harrow-teeth G, of any approved form. The sulky-wheels C C rotate on the ground within the harrow-frame.

We are not limited to the use of a harrow of general circular form, as the harrow may be of oval, square, or any other shape; neither are we limited to the arrangement of the sulky-wheels within the harrow-frame; but the construction shown and above described is preferred in practice.

The harrow is supported from the sulky-frame A by means of sling-chains H H, which are attached to and may be wound upon drums $h$ $h$ on a shaft, I, which is journaled in boxes $i$ $i$ at front and rear of the frame A and carries a worm-wheel, I', with which meshes a worm, J', fixed to a vertical shaft, J, which is journaled in lower and upper brackets, $j$ $j$, fixed to the frame A, and has a hand-wheel, $j'$, in convenient reach of the operator on a seat, K, which is preferably supported on a spring, $k$, fitted around a vertical spindle or shaft, $k'$, held to a base-plate, $k^2$, on the frame A, and on which spindle the seat is loosely fitted and guided in its vertical movements occasioned by travel of the machine over rough ground, the spring easing the jolts to assure the comfort of the rider on the seat.

It is obvious that by turning the shaft J the chains H may be either wound upon or unwound from their drums $h$, as may be required to regulate to a nicety the depth at which the harrow-teeth will work in the soil, or to lift the harrow clear of obstructions in its path, or to raise the harrow clear of the ground while the machine is traveling to and from the place of use. When the harrow is in use, it will be supported by the chains H, so that its bearing E on the shaft D will be entirely clear of the brace-bars $d$, in which the shaft is stepped, thus avoiding friction and noise.

The harrow is oscillated horizontally as the machine moves forward by means of mechanism driven from the sulky-wheels and as next described. A shaft, L, is journaled transversely of the machine in bearings $l$ $l$ on the frame A, and carries fixedly at each end a plate or collar, M, which carries a spring-pressed pawl, $m$, which engages a ratchet-wheel, N, fixed to a pinion, O, which meshes with a gear-wheel, P, cast upon or fixed to the spokes of the adjacent sulky-wheel C. The pinions N and their ratchets O are loose upon the shaft L, allowing either of the pinions with its ratchet to overrun the shaft when the machine is being turned to either side and permitting the backing of the machine without effect on the shaft. To the shaft L is fixed a bevel gear-wheel, R, which meshes with a pinion, r, on a longitudinally-ranging shaft, S, which is journaled in bearings s s, fixed to the frame A, and carries at its forward end a crank-disk, s', to the wrist $s^2$ of which is connected a pitman, T, which is attached to the upper end of a vibratory lever, U, fulcrumed at u to a bracket, a, fixed to the frame A. The lower end of the lever U is provided with a slot, u', into which passes a pin, V, fixed to the front of the harrow-frame, and whereby as the lever is operated by the above-described gearing the harrow will be oscillated horizontally on its center pivot, D, through arcs or strokes of about six inches, or three inches each way from the center line of the harrow, and while the harrow is suspended by the chains H. The lever-slot u' allows the harrow to be raised or lowered by the windlass without stopping its oscillation.

It is obvious, as the harrow is pivoted at its center, or center of gravity, and is therefore balanced, that very little power is required to oscillate it, as above described, and the tendency is rather to lighten the draft of the machine than to increase it, as the worm-like passage of the harrow-teeth through the ground facilitates the easy and complete crushing and comminution of the clods of earth, so that the harrowing is finished by one passage of the machine over the field, and cross-harrowing is unnecessary. The oscillation of the harrow may be stopped or started at any time by the driver, who may conveniently shift a lever, W, fulcrumed at w on the frame A, and engaging a peripheral groove in a collar, X, fixed to the shaft S, and thereby disengage or connect the bevel-pinion r from or with the gear-wheel R on the shaft L by sliding the shaft S longitudinally in its bearings.

It may be desirable to oscillate the harrow from but one of the wheels C of the sulky, and this modified arrangement is shown in Fig. 6 of the drawings, wherein the bevel-pinion r on the shaft S is geared directly with a bevel-gear, P', fixed to the adjacent sulky-wheel C, and the shaft L is dispensed with. The operation of the harrow is precisely the same in this case as when it is oscillated by the traction-power of both sulky-wheels, as above described.

We connect the draft tongue or pole Y of the machine to a couple of irons, y y, which are bolted to the forward end of the frame A in a manner to allow the working of the harrow-oscillating lever between them and behind the tongue. The doubletree Z and singletrees z z may be held to the tongue in any ordinary or approved way.

Having thus described our invention, what we claim as new, and desire to secure by Letters Patent, is—

1. The combination, with the main or draft frame and its wheels, of the horizontal harrow-frame oscillating on a vertical axis and formed of an outer rim, F', having harrow-teeth, and bars F F, connecting the rim and the hub and having harrow-teeth, and means for imparting a semi-rotary motion to the said frame from one or both vehicle-wheels, substantially as set forth.

2. The combination, with the vehicle frame and wheels, of a horizontally-oscillating harrow-frame having an outer or marginal rim, within which the vehicle-wheels are inclosed, substantially as set forth.

3. The combination, in a harrow, of a sulky comprising a frame, A, axle B, and wheels C C, a vertical shaft, D, held to the sulky, a horizontal harrow, F F' G, journaled on the lower end of the shaft D, a windlass device suspending the harrow adjustably from the frame A, a longitudinally-extending shaft, S, journaled on the frame A and geared with one or both of the sulky-wheels, a lever, U, fulcrumed between its ends on the frame A and connected to the shaft S, and attached to the harrow-frame by a slot-and-pin connection, u' V, to allow of the vertical adjustment of the harrow without stopping its oscillation, substantially as described, for the purpose set forth.

4. In an oscillating harrow, the toothed harrow-frame constructed with an outer rim, F', and a central hub, E, connected by bars or spokes F, combined with an upright shaft, D, on which the hub E is journaled, and braces d, connected to the frame and staying the lower end of the shaft, the inner ends, f, of the bars F being bent upward between the braces d for connection to the hub E, substantially as shown and described.

CALVIN HUGH WEEKS.
WILLIAM SELLERS.

Witnesses:
FRANCIS H. PEARL,
JOSEPH H. PEARL.